United States Patent
Hata et al.

(10) Patent No.: US 6,865,799 B2
(45) Date of Patent: Mar. 15, 2005

(54) METHOD OF MANUFACTURING STRAIN-DETECTING DEVICES

(75) Inventors: Yukihiko Hata, Ohta-ku (JP); Kunihiro Yamaura, Ohta-ku (JP); Hiroshi Nagasaka, Ohta-ku (JP)

(73) Assignee: Nagano Keiki Co., Ltd. (JP)

(*) Notice: Subject to any disclaimer, the term of this patent is extended or adjusted under 35 U.S.C. 154(b) by 201 days.

(21) Appl. No.: 10/255,620

(22) Filed: Sep. 27, 2002

(65) Prior Publication Data
US 2003/0079551 A1 May 1, 2003

(30) Foreign Application Priority Data
Oct. 30, 2001 (JP) .................................. 2001-332863

(51) Int. Cl.[7] .............................................. H01C 17/28
(52) U.S. Cl. .................. 29/621.1; 29/25.41; 29/454; 29/559; 29/595; 73/718; 73/723; 73/760; 361/283.4
(58) Field of Search ........................... 29/621.1, 25.41, 29/454, 559, 595; 73/718, 723, 760; 361/283.4

(56) References Cited

U.S. PATENT DOCUMENTS 4,040,118 A * 8/1977 Johnston ................ 361/283.4
6,474,170 B1 * 11/2002 Yamagishi et al. .......... 73/723

FOREIGN PATENT DOCUMENTS

| EP | 0 381 775 | 8/1990 |
|---|---|---|
| JP | 04 015533 | 1/1992 |
| JP | 08 029280 | 2/1996 |
| JP | 11 311577 | 11/1999 |

* cited by examiner

Primary Examiner—Carl J. Arbes
Assistant Examiner—Tim Phan
(74) Attorney, Agent, or Firm—Parkhurst & Wendel, L.L.P.

(57) ABSTRACT

A method of manufacturing strain-detecting devices is provided. First, plural cylindrical substrates, each of which has one end closed by a diaphragm, are fixedly placed at predetermined positions of a fixing plate. A positioning marker is previously given to the fixing plate. The fixing plate having the substrates is then assembled into a jig. The jig sustains the substrates so that an outer surface of the diaphragm of each substrate is held at the same level. Through positioning the substrates, all the diaphragms are then positioned in place in a plane direction of the fixing plate with reference to the positioning marker. A strain gage portion is simultaneously formed on each of all the diaphragms. The fixing plate is then disassembled from the jig. In this step, the substrates with the strain gage portions, i.e., strain-detecting devices, are separated from the fixing plate.

8 Claims, 13 Drawing Sheets

METHOD OF MANUFACTURING STRAIN-DETECTING DEVICES

CROSS REFERENCE TO RELATED DOCUMENT

This application claims the benefit of Japanese application 2001-332863 filed Oct. 30, 2001.

BACKGROUND OF THE INVENTION

The present invention relates to a method of manufacturing strain-detecting devices.

Elements for detecting strain are categorized into a variety of types of elements. One type of strain-detecting device uses a diaphragm on which a strain gage is arranged. The diaphragm responds to stimulation that has been given, and the strain gage senses the stimulation based on physical changes in the diaphragm. Such strain-detecting devices have been manufactured by using various types of methods.

Referring to FIGS. 1 and 2, one type of manufacturing method will now be described. As shown therein, a jig 1 made up of upper and lower plates 1a and 1b are used. This jig 1 is made to have lot of holes 3 formed at given positions thereof. The holes 3 are responsible for sustaining substrates 2 of the strain-detecting devices with precision concerning their sizes and pitches. The holes 3 are the same in number as the substrates 2. A great deal of substrates 2 (dozens of pieces to several hundreds of pieces) are contained in the single jig 1.

Each substrate 2 is formed into a cylindrical body of which one end closed by a diaphragm 4 (refer to FIG. 2). The dimensions, such as an outer diameter, of each substrate 2 is finished with higher precision, because it is required that each substrate 2 be fit into each hole 3 of the jig 1 with no looseness. As shown in FIGS. 1 and 2, after fitting the substrates 2 to the jig 1, all the substrates 2 are positioned such that the upper surfaces of all the diaphragms 4 take the same height position. This height is determined by regarding the upper surface of the upper plate 1a as a reference position. Thus, the upper surfaces of all the diaphragms 4 constitute the same plane.

The jig 1 which sustain the substrates 2 is then delivered to the next step in which a strain gage portion is formed on each diaphragm 4. In this step, first, both of an insulation layer and a strain gage layer are formed by turns on the upper surface of each diaphragm 4. Relying on accurately worked reference holes 5 formed at given positions of the jig 1, patterning a strain gage is carried out using a photolithography process so that a strain gage is formed simultaneously on all the diaphragms 4. Masks are set over the jig 1 with reference to the reference holes 5, and a physical vapor deposition process is conducted to form electrodes and a strain-gage protection layer on the strain gages by turns.

After completing the strain gage portion, the substrates 2 are detached from jig 1. The detached substrates 2, on which the strain gage portions are formed individually, are used as strain-detecting devices.

A second type of method of manufacturing strain-detecting devices is provided by Japanese Patent Publication No. 2768804, which can be pictorially shown in FIGS. 3 and 4. As shown therein, a jig 7 is employed, on which a plurality of pins 6 are built. Each substrate 2 is put on each pin 6 in such a manner that the pin 6 is pressed into a bottomed opening formed in the substrate 2. The bottom of the opening functions as a diaphragm 4. The upper surfaces of all the diaphragms 4 are kept to be included in the same plane. Various thin layers are then formed by turns on each diaphragm 4. The thin layers on the individual diaphragms 4 are then subjected to micro fabrication and other necessary work. Therefore, a plurality of strain-detecting devices are manufactured at a time.

However, the foregoing conventional manufacturing methods have faced various problems.

In the former manufacturing method shown in FIGS. 1 and 2, a first problem comes from the shape of each substrate 2. The substrate 2 can be summarized as being cylindrical, thus being rotatable around its center axis even when being held by the jig 1. It is therefore difficult to position each substrate 2 in its rotating direction.

A second problem results from a gap between each substrate 2 and the jig 1. This gap causes each substrate 2 to shift, against the jig 1, in the plane direction along which the jig 1 (that is, plates 1a and 1b) extends (that is, the X-Y direction in FIG. 1). This shift will spoil positioning between the gage patterns for strain gages and the mask patterns for electrodes and a protection layer. That is, the strain gages cannot be placed in place on each diaphragm 4, being a defective device.

To avoid the manufacture of such defective devices, both of the substrates 2 and the jig 1 should be positioned precisely with each other. To meet this demand, it should be necessary that the jig 1 as well as the substrates 2 be finished with higher precision. A third problems is therefore that the cost of manufacturing strain-detecting devices has been high, because of higher degrees of finishing precision of both of the jig 1 and the substrates 2.

On the other hand, the foregoing latter manufacturing method represented by FIGS. 3 and 4 is also accompanied by a number of problems. A first problem is also concerned with a manufacturing cost. The diaphragms 4 of all the substrates 2 fitted to the jig 7 should be the same height so as to form the same plane. If this condition is satisfied, dimensional errors of the thin layer patterns can be minimized. In order to realize the same plane configuration, both of the reference positions for positioning the substrates 2 on the jig 7 and intervals of holes into which the pins 6 are inserted respectively should be finished with higher precision. Such higher precision of finish will bring about an increase in manufacturing strain-detecting devices.

A second problem results from the fact that each pin 6 is pressed into the bottomed opening (cavity) of each jig 7. There are some cases where pressing the pin 6 into the opening damages the surface of the opening, thus decreasing the reliability of the devices themselves. If such damaged strain-detecting devices are applied to, for example, pressure vessels, the reliability of the pressure vessels themselves will be spoiled as well. In addition, as the number of uses of the jig 7 is increased, the pins 6 are worn away. Further, during the step of forming the strain gage portion, the pins 6 are exposed to a high-temperature atmosphere. Hence the elasticity of each pin 6 is degraded, thereby weakening a force for sustaining the substrate 2. These drawbacks will also lead to unstable factors in enhancing the reliability.

Further, a third problem is caused by the configuration in which each pin 6 is pressed into the bottomed opening of each substrate 2. Because of this configuration, various types of fluid, such as cleaning fluid, developing fluid, rinsing fluid, and resist separating agent, which have been flowed into the bottomed opening of each substrate 2 during a cleaning step and thin-layer micro-fabrication steps, are apt to remain therein, even after completing such steps. The residue of such fluids often brings about a pollutant problem in the various post-steps for manufacturing strain-detecting devices.

SUMMARY OF THE INVENTION

The present invention has been made in view of the above circumstances, and an object of the present invention is, therefore, to provide a method of manufacturing strain-detecting devices, which is able to precisely position substrates on a jig, thus allowing gage patterns to be formed highly accurately on the diaphragm of each substrate, with a manufacturing cost still suppressed.

A second object of the present invention is to provide a method of manufacturing strain-detecting devices, which is able to provide strain-detecting devices whose reliability is greatly improved, in addition to realize the above first object.

In order to realize the above objects, the present invention primarily provides a method of manufacturing strain-detecting devices, comprising the steps of: fixedly placing, at predetermined positions of a fixing plate, a plurality of cylindrical substrates each of which has one end closed by a diaphragm, a positioning marker being previously formed at a given position of the fixing plate; assembling the fixing plate having the substrates into a jig to make the jig sustain the substrates so that an outer surface of the diaphragm of each substrate is held at the same level higher by a predetermined height from a reference position; positioning all the substrates so that all the diaphragms thereof are positioned in place in a plane direction of the fixing plate with reference to the positioning marker; and simultaneously producing a strain gage portion on each of all the diaphragms.

According to the above configuration, a plurality of substrates are each fixedly placed at predetermined positions of the fixing plate, and then the fixing plate itself, which has the substrates, assembled into the jig. Hence it is possible to hold the outer surfaces of all the diaphragms at the same predetermined height so as to form the same plane with higher positional precision and without looseness. Further, because the positioning marker previously formed at a given position of the fixing plate is used to position all the diaphragms in the plane direction of the fixing plate. Hence no higher-precision positioning is required between the jig and the substrates in the plane direction of the fixing plate. This means that when the fixing plate is assembled into the jig, no higher-precision positioning is also required as in the plane direction of the fixing plate. This will lead to a reduced manufacturing cost of the devices. Still further, the plural substrates can be handled as one unit together with the fixing plate, so that various types of work, such as changing jigs and positioning of the substrates, can be done quickly and with ease during the steps for forming a strain gage portion on the diaphragms.

Preferably, the assembling step includes a step of connecting each substrate to an elastic member previously arranged at each of predetermined positions of the fixing plate, the elastic member being elastically deformable in a thickness direction of the fixing plate. Hence in cases where the substrates are fitted into the jig with the help of the fixing plate, the substrates can be contacted elastically with the jig. This makes it easier and smoother to hold the surface of all the diaphragms at the same level, which is higher by a predetermined height from the reference position.

It is still preferred that a plurality of through-holes each of which accepts each substrate are formed at each of the predetermined positions of the fixing plate and the elastic member is arranged on a surface of the through-hole. Hence, by inserting each substrate into each through-hole, the substrates can be fixed to the fixing plate in an easier and secure manner. The through-holes are also helpful in making them discharge outside the substrates various types of chemical agent used during the forming of a strain gage portion on each diaphragm. Hence the residue of such chemical agents is extremely reduced, thereby having almost no influence on postproduction steps. Moreover, it is advantageous that both of the through-holes and the elastic members can be formed at a relatively lower cost, but with precision, by combining photolithography and etching processes.

It is also preferred that each substrate has an annular protrusion integrally formed on an outer cylindrical surface thereof and connected to the fixing plate. Hence no damage is given to the inner surface of each substrate, including the inner surface of the diaphragm. The reliability of the device itself is increased, and the device is suitable for use of, for example, pressure vessels.

Still preferred is that the elastic member has a protruding part integrally formed thereon and connected to the annular protrusion of each substrate. Accordingly, the substrates can easily be connected to the fixing plate by welding the annular protrusion to the protruding part. A spot to be welded is at the protruding part, ensuring that the welding is done steadily, without using a welding electrode whose tip is made thin.

By way of example, the elastic member consists of a plurality of elastic members arranged on the surface of each through hole. That is, each substrate is sustained by a plurality of elastic members, so that the substrates are kept in the fixing plate without shifts in the plate direction of the fixing plate. This improves accuracy in the positioning in the plane direction.

It is preferred that the method further comprises the step of disassembling the fixing pate from the jig, including a step of separating each of the substrates from the fixing plate by cutting the elastic members after forming the strain gage portions. Only cutting the elastic members allows the substrates, which function as strain-detecting devices, to be separated from the fixing plate in an easier manner.

BRIEF DESCRIPTION OF THE DRAWINGS

Other objects and aspects of the present invention will become apparent from the following description and embodiments with reference to the accompanying drawings in which.

DETAILED DESCRIPTION OF THE PREFERRED EMBODIMENT

A preferred embodiment according to the present invention will now be described with reference to FIGS. 5 to 15.

First, strain-detecting devices manufactured by a manufacturing method of the present invention will be exemplified.

Figure 1:
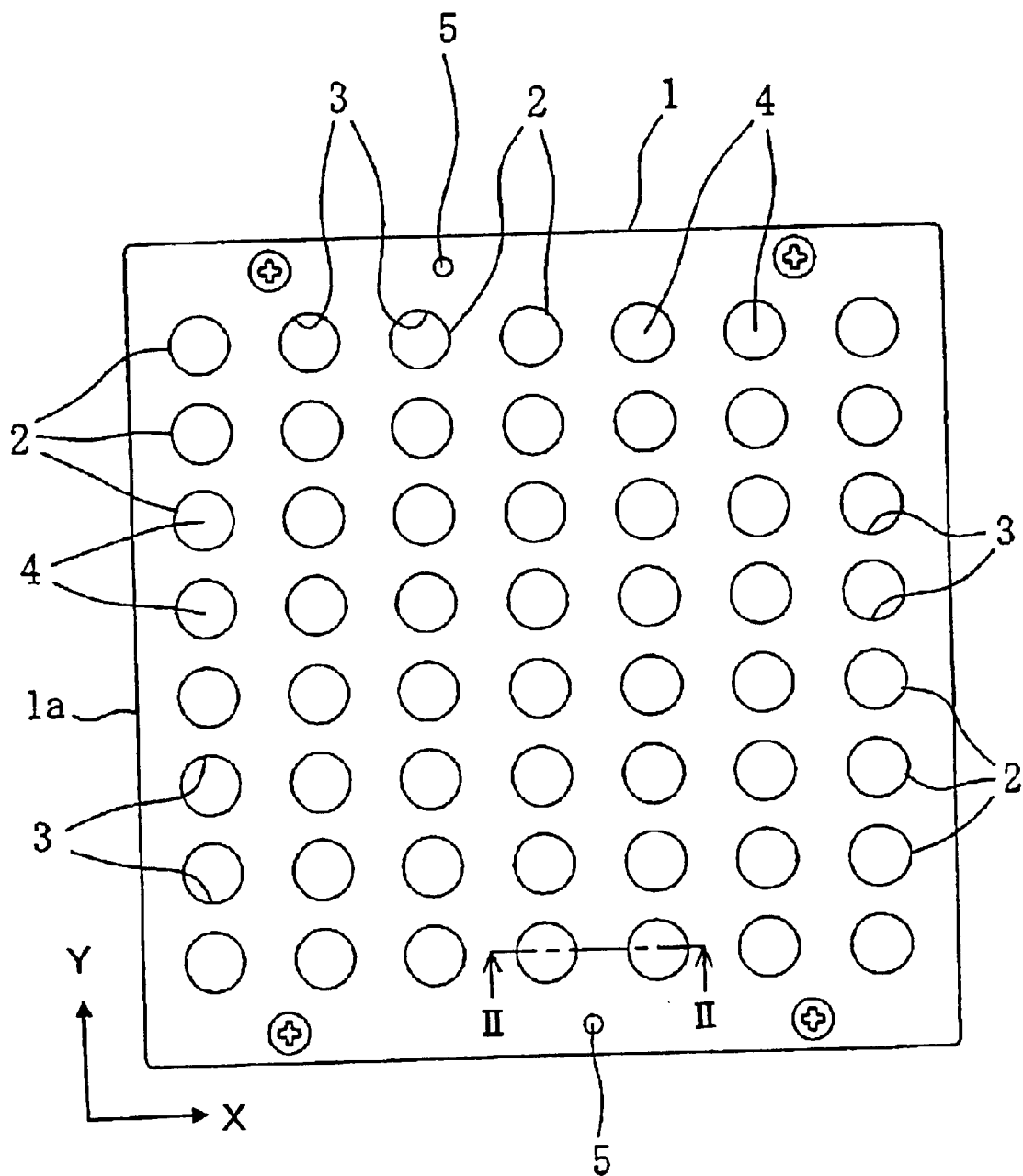
FIG. 1 is a plan view showing a jig to which substrates are mounted according to a conventional manufacturing method of strain-detecting devices.
Figure 2:
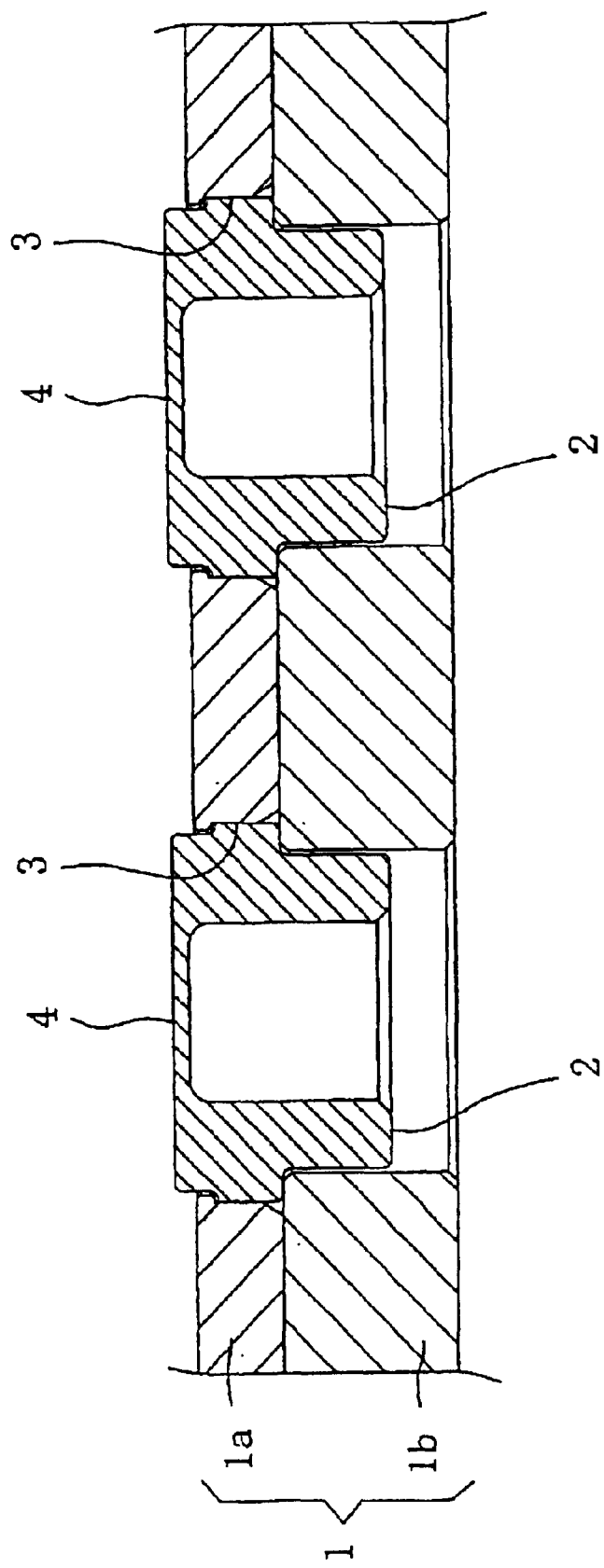
FIG. 2 shows a cross section partially cut along a line II—II in FIG. 1.
Figure 3:
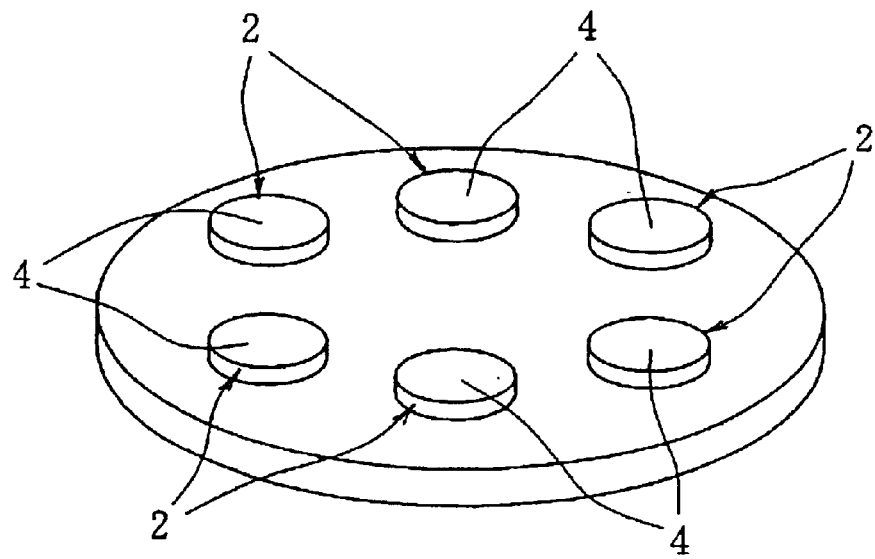
FIG. 3 is a perspective view showing a jig to which substrates are mounted according to a second conventional manufacturing method of strain-detecting devices.
Figure 4:
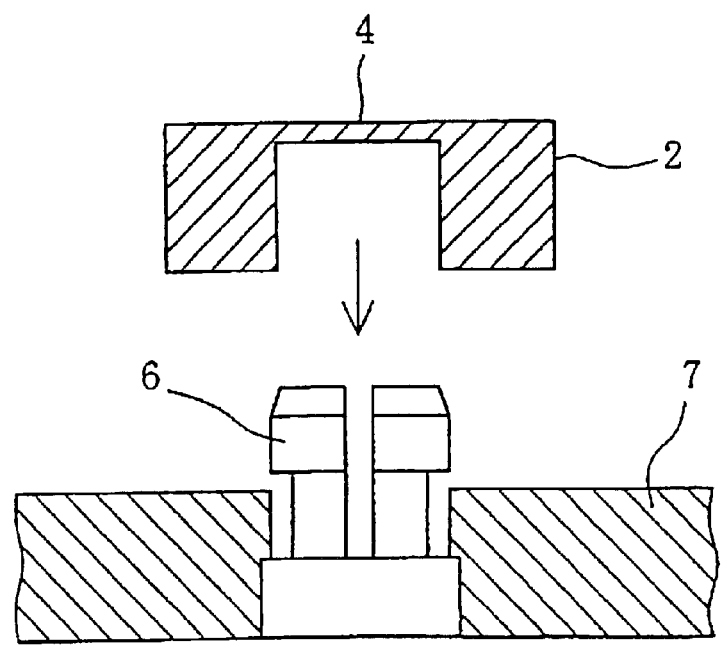
FIG. 4 shows a perpendicular cross section of part of the jig shown by FIG. 3.
Figure 5:
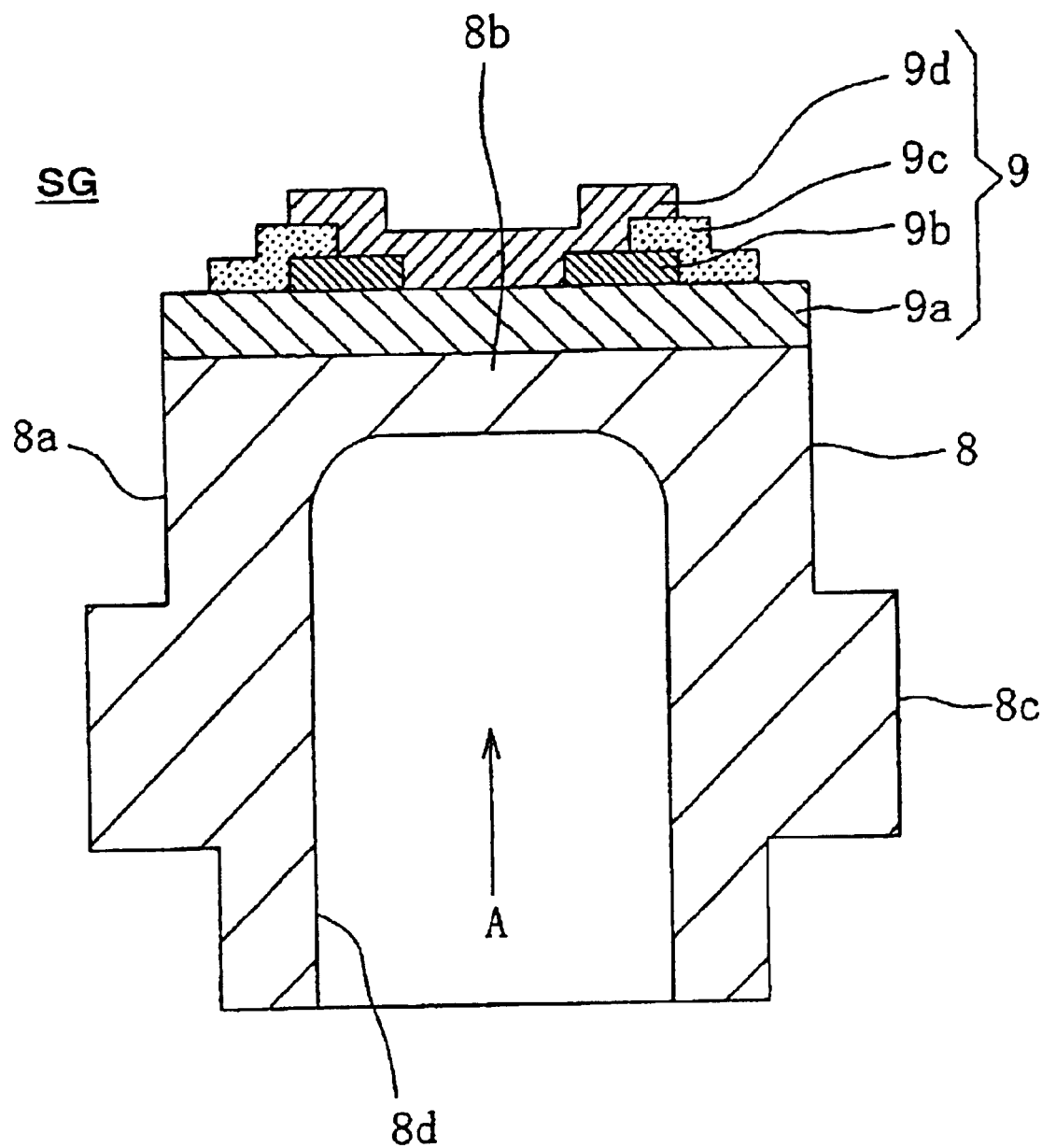
FIG. 5 shows a longitudinal section of one of strain-detecting devices to be manufactured based on the manufacturing method according to the present embodiment.

FIG. 5 exemplifies a strain-detecting device SG, which is equipped with a substrate 8 and a strain gage portion 9 formed on the substrate 8.

Figure 6:
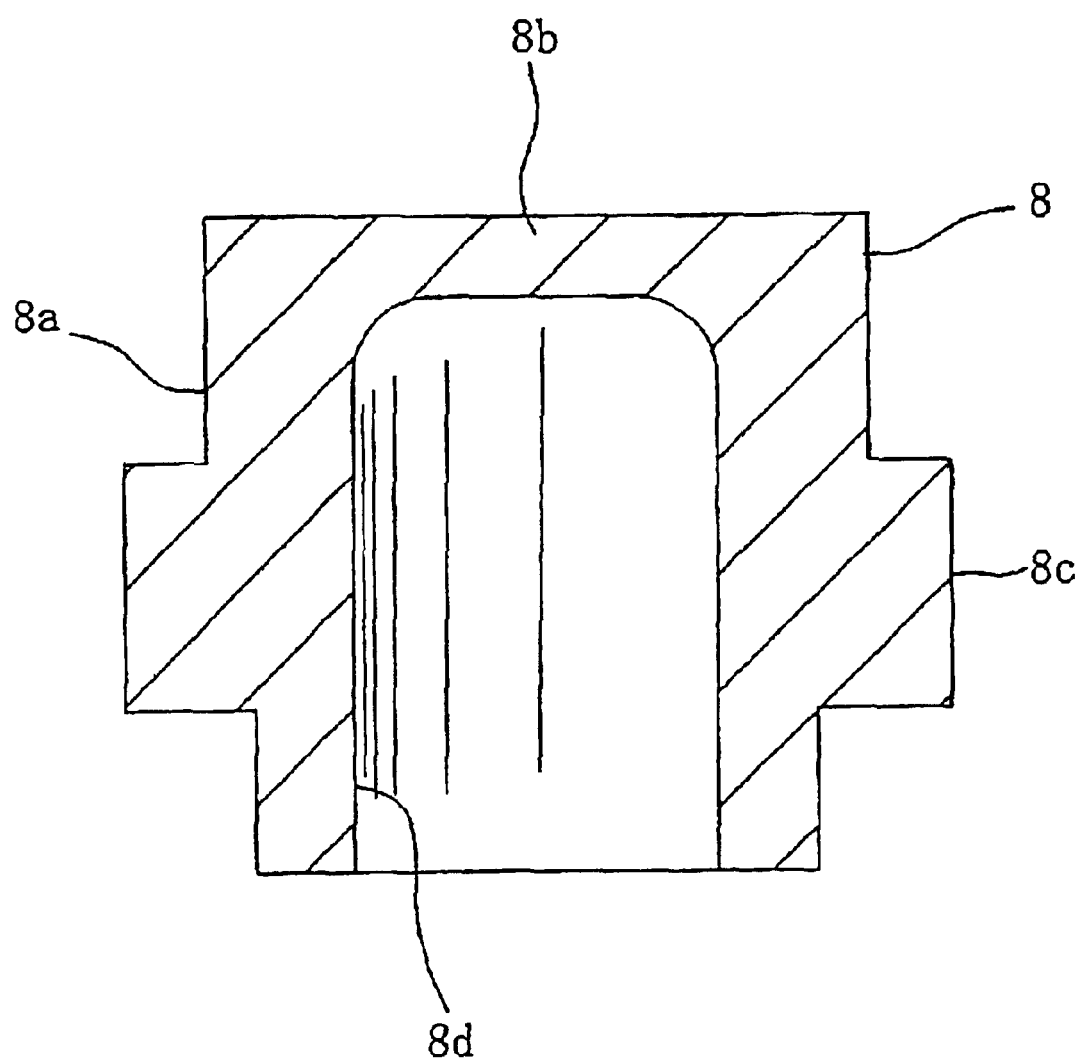
FIG. 6 shows a longitudinal section of a substrate used by one strain-detecting device.

The substrate 8, which is formed into a single rigid body made of a given metal material, has a cylindrical pillar 8a having both ends in its axial direction. As shown in FIGS. 5 and 6, one end is integrally closed with a thin plate, while the other end is opened. The part of the thin plate functions as a diaphragm 8b.

Further, a cavity (bottomed opening) 8d with an aperture at one end is formed in the cylindrical pillar 8a. When fluid is administered into the cavity 8d as illustrated by an arrow A in FIG. 5, the pressure of the fluid acts on the back of the diaphragm 8b, thereby causing the diaphragm 8b to be deformed. An annular protrusion 8c is integrally formed outwardly from the outer side of the cylindrical pillar 8a.

The strain gage portion 9 includes an insulation layer 9a laminated on the outer surface of the diaphragm 8b, strain gages 9b, electrodes 9c, and a protection layer 9d for protecting the strain gages 9b. Accordingly, when pressure is applied to the strain-detecting device by administering fluid into the cavity 8d, the diaphragm 8b, which serves as a pressure-receiving portion, deforms. The strain gage portion 9 senses strain caused due to the deformation, and outputs a signal indicative of the strength of the strain.

The strain-detecting device, which is configured as above, is manufactured in large-scale production through the following steps. Thus, a large number of strain-detecting devices SG are manufactured at a time.

Figure 7:
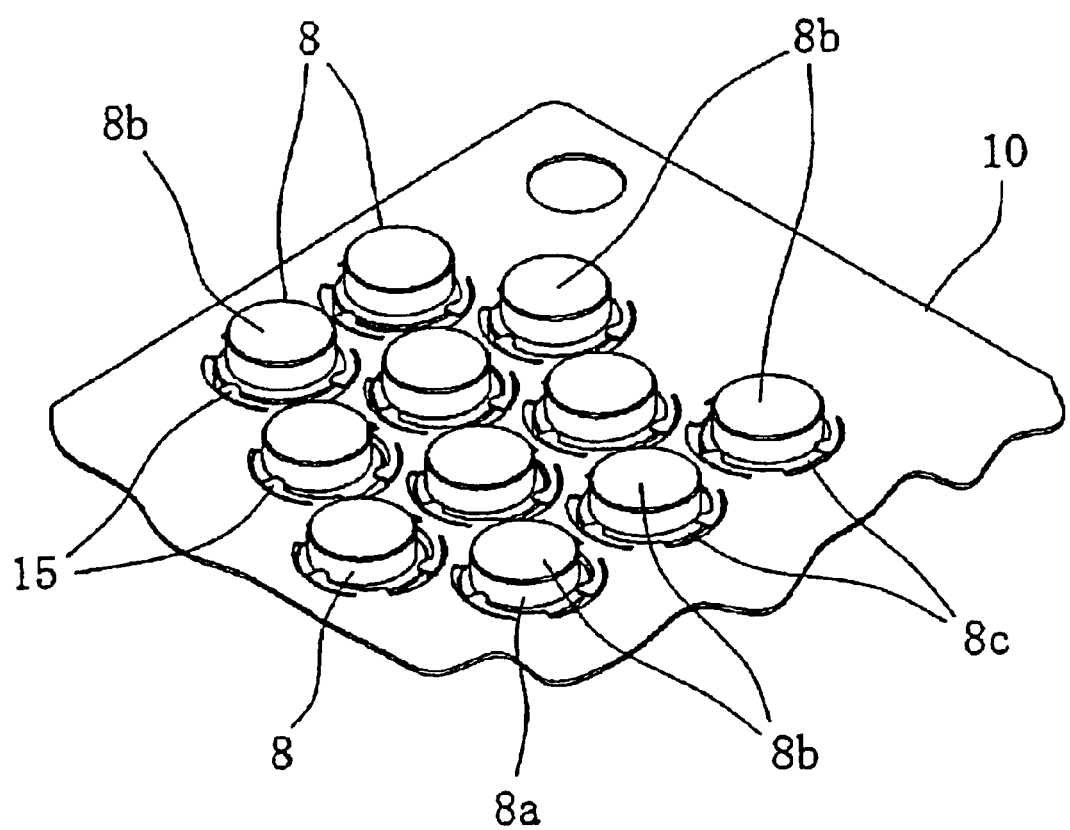
FIG. 7 is a partially cut perspective view showing a plurality of substrates (one of which is shown in FIG. 6) fixedly arranged at given positions of a fixing plate.
Figure 8:
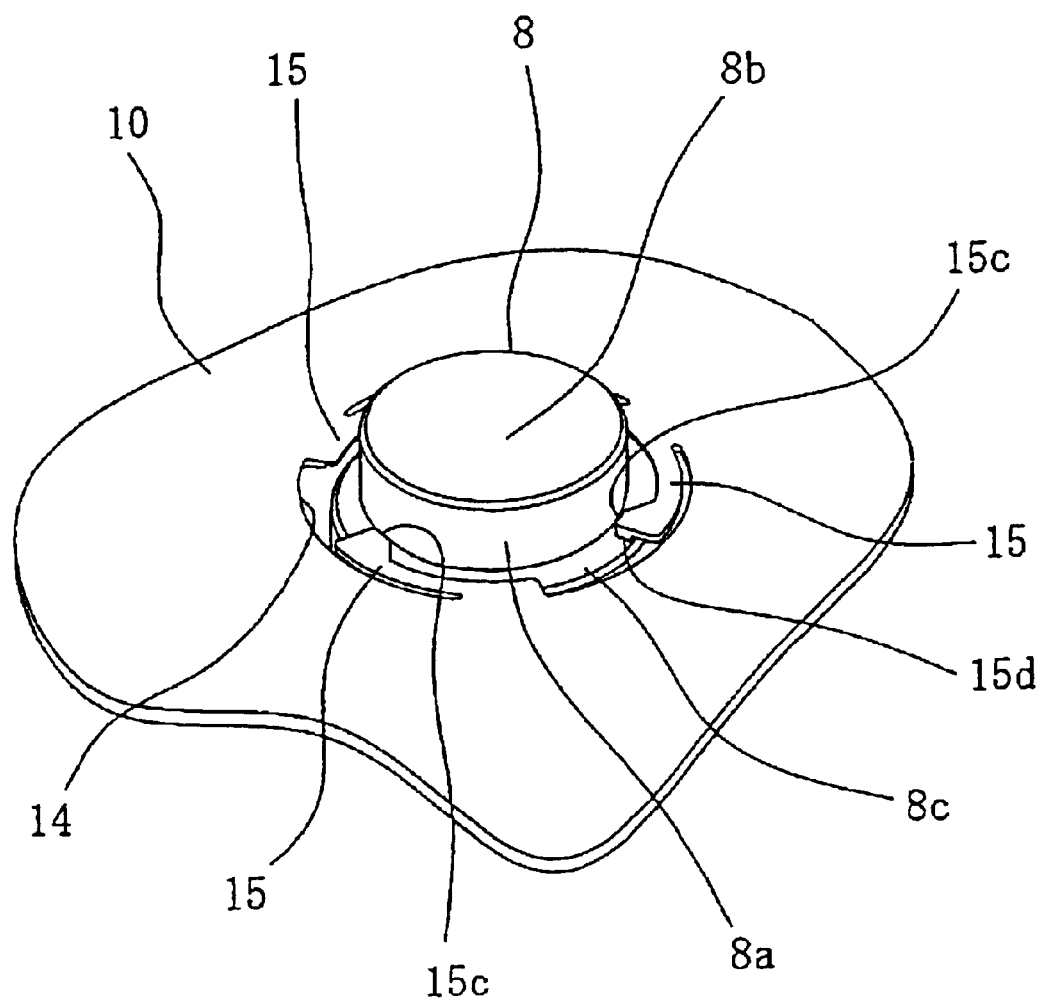
FIG. 8 is an enlarged perspective view of one substrate partially cut from FIG. 7.
Figure 13:
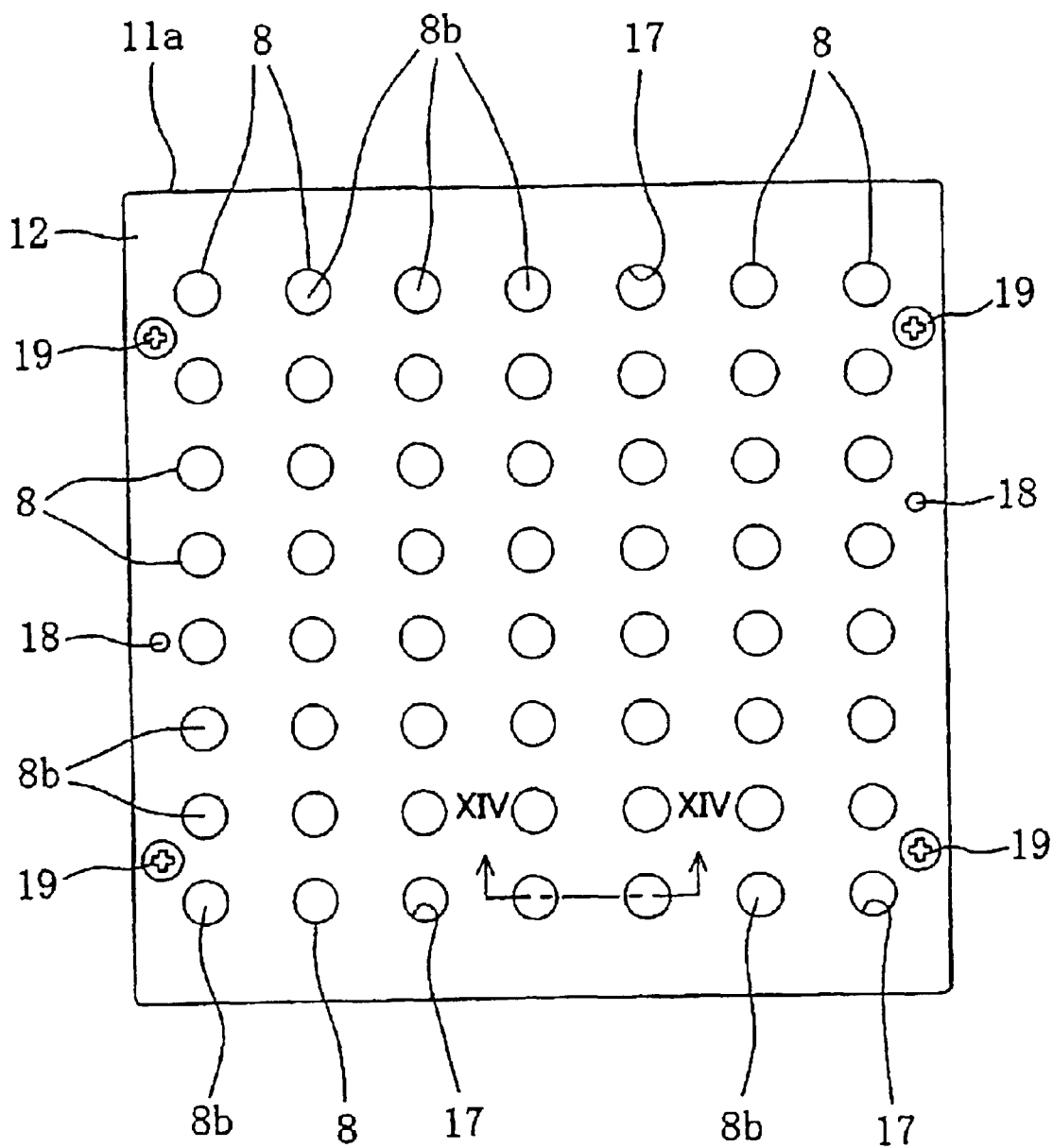
FIG. 13 depicts a plan view showing the substrates mounted to a jig also employed by the manufacturing method according to the present embodiment.
Figure 14:
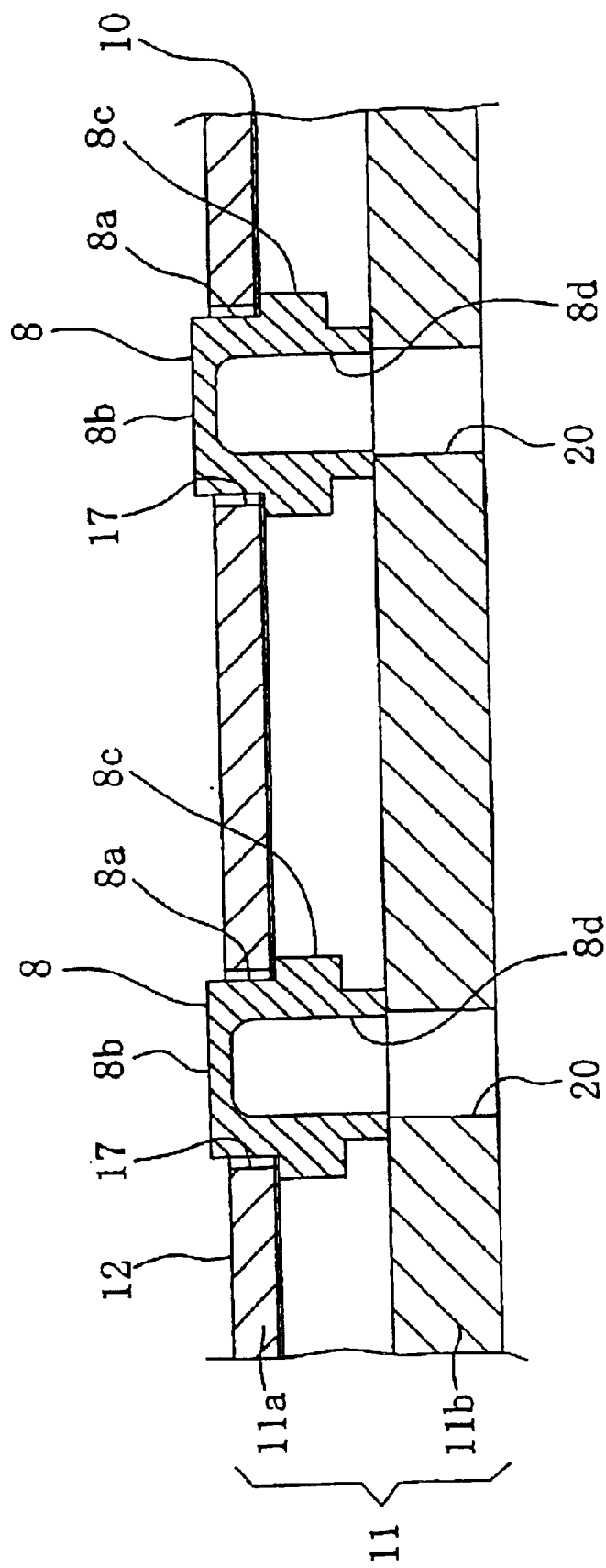
FIG. 14 shows a cross section partially cut along a line XIV—XIV in FIG. 13.

As shown in FIGS. 7 and 8, a large number of substrates 8 are fixed individually at predetermined positions on a fixing plate 10. Then, as shown in FIGS. 13 and 14, the substrates 8 are supported by a jig 11 with the fixing plate 10 clipped in the jig 11, so that the outer surfaces of all the diaphragms 8b are positioned at the same level higher than a reference position 12 of the jig 11 (refer to FIG. 13). The reference position is assigned to the position of a later-described upper plate of the jig 11.

Figure 9:
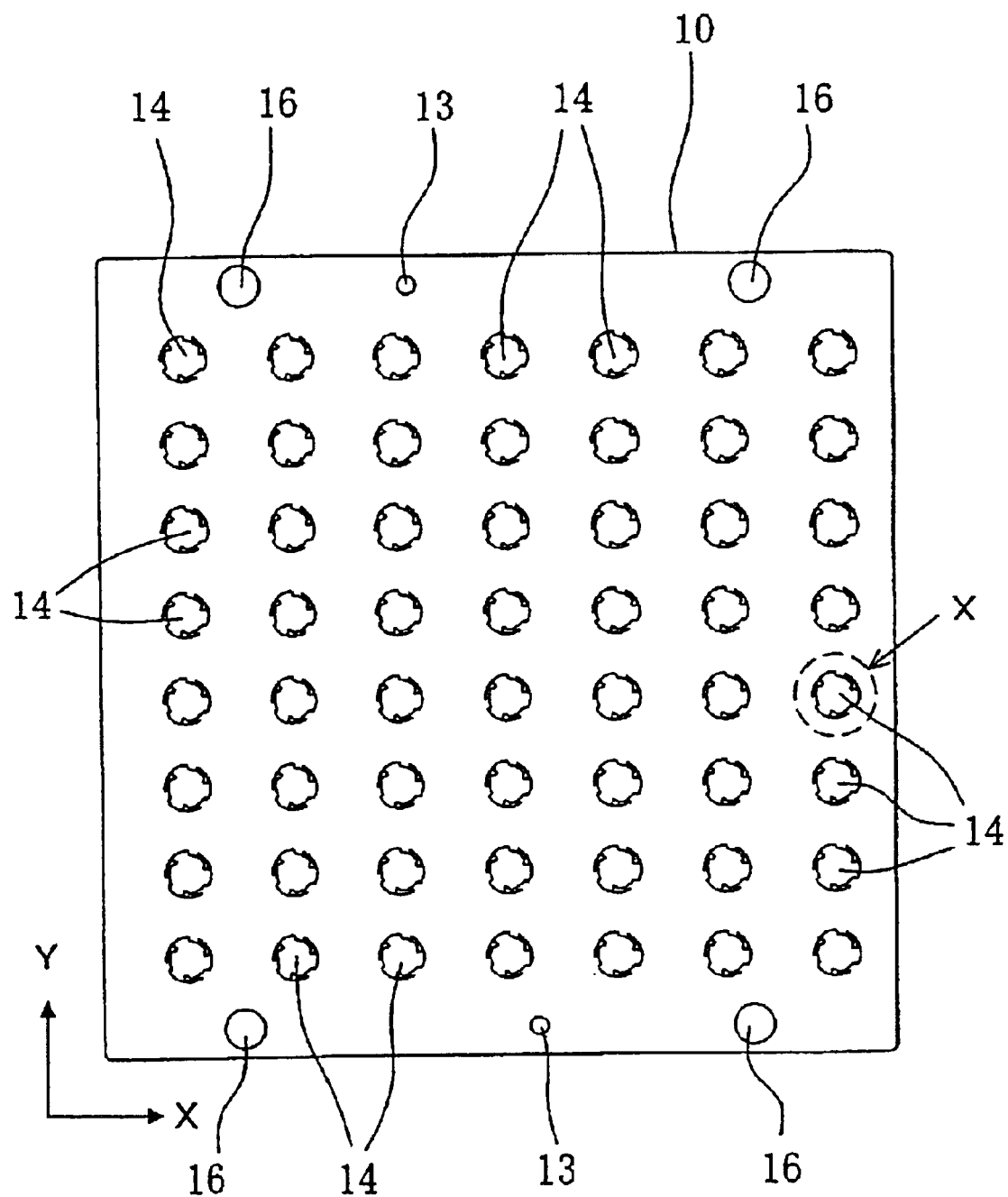
FIG. 9 is a plan view showing the fixing plate.

Then, using as a reference a positioning marker 13 previously formed through the fixing plate 10, as shown in FIG. 9, the substrates 8 are subjected to positioning in the plane direction (i.e., X-Y direction) of the fixing plate 10, so that the outer surfaces of all the diaphragms 8b are positioned in place. All the diaphragms 8b are then subjected to simultaneous production step of the strain gage portions 9.

The above steps will now be detailed. First of all, both of the substrate 8 shown in FIG. 6 and the fixing plate 10 shown in FIG. 9 are prepared.

Each substrate 8 is machined with higher precision so as to have the same form shown in FIG. 6.

Figure 10:
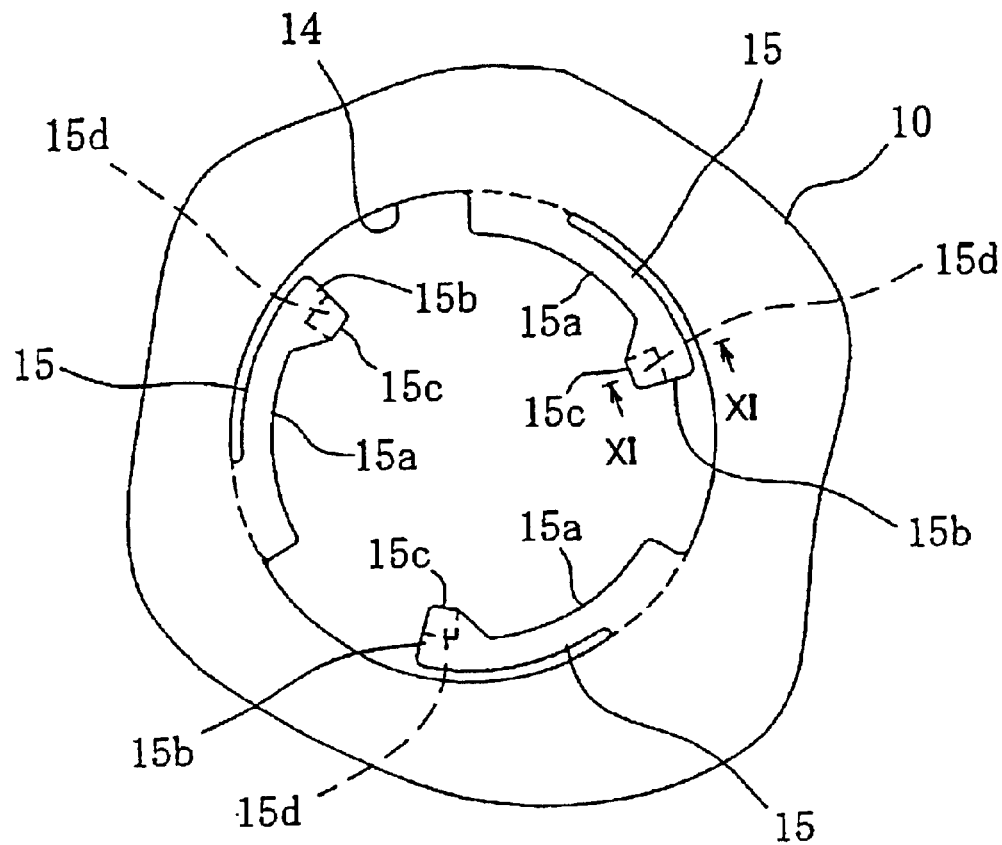
FIG. 10 is an enlarged plan view cut along a circle shown by an arrow X in FIG. 9.

The fixing plate 10 is made into a metal plate to have a uniform thickness ranging from 0.1 to 0.2 mm. As shown in FIGS. 9 and 10, a large number of through-holes 14 having the same diameter are formed in place through the fixing plate 10. The diameter of each through-hole 14 and a pitch between through-holes 14 are finished with higher precision. By way of example, the through-holes 14 can be drilled with the use of a process of photolithography combined with etching. If using this process, the fixing plate 10 can be provided with higher precision, but at a relatively lower production cost.

Figure 11:
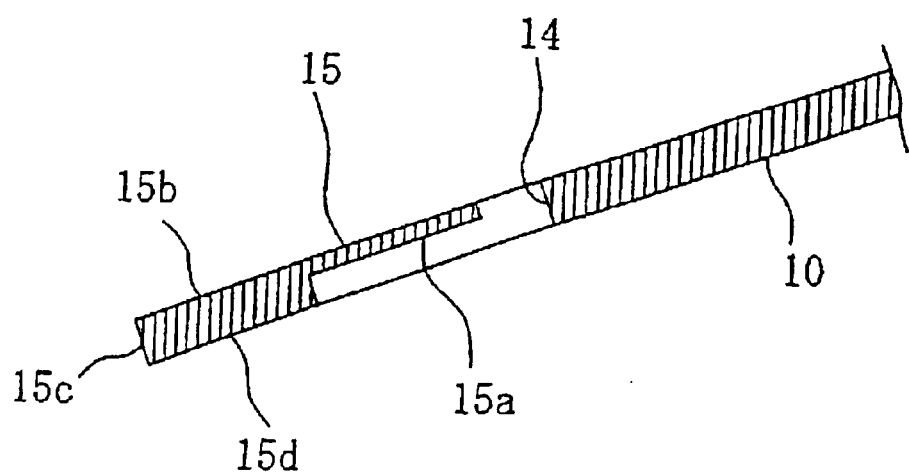
FIG. 11 illustrates a section partially cut along a line XI—XI.
Figure 12:
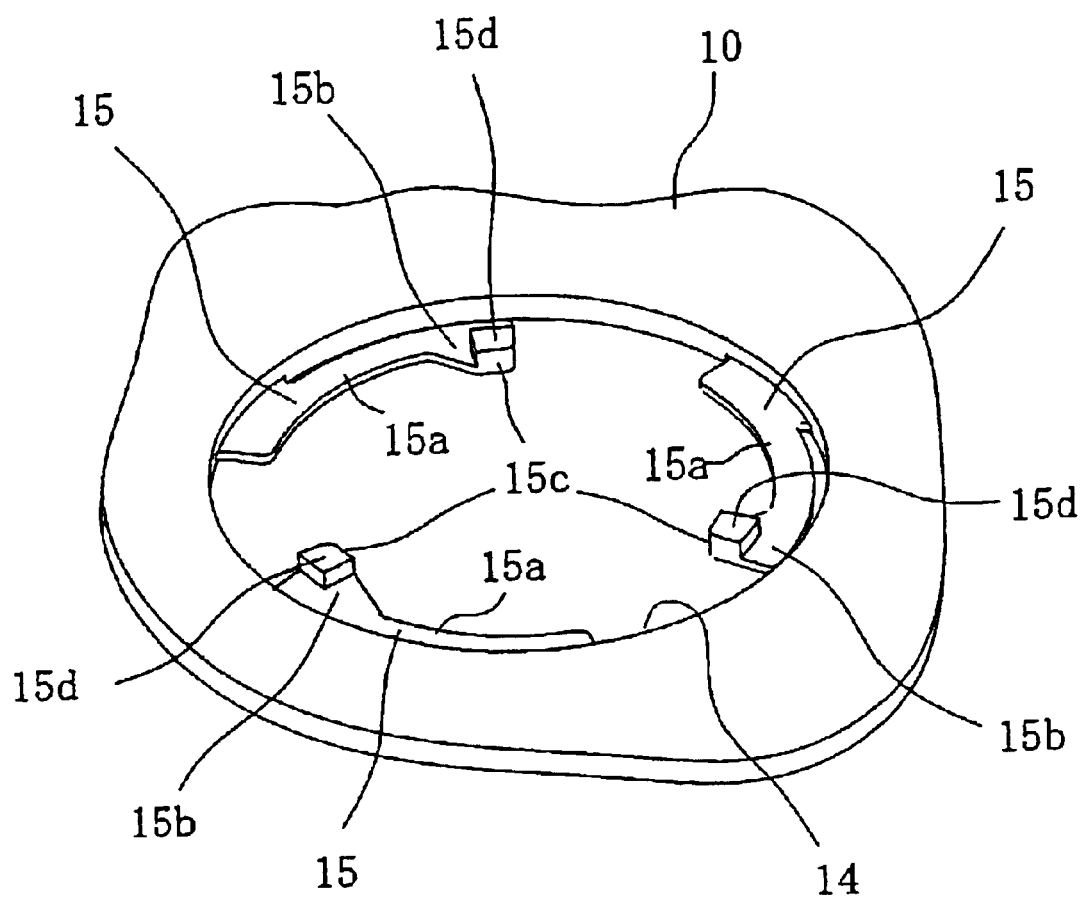
FIG. 12 illustrates a rear-side local perspective view of the fixing plate shown in FIG. 10.

Each through-hole 14 is formed into, by way of example, a simple round hole into which the cylindrical pillar 8a of each substrate 8 is inserted. Preferably, as shown in FIGS. 10 to 12, elastic members 15 are attached to the inner surface of each through-hole 14 (for example, round hole). Although the single elastic member 15 still meets a demand, it is still preferred that a plurality of elastic members 15 (for example, three pieces) are formed in parallel with drilling the round hole through the process of photolithography combined with etching.

Each elastic member 15 is composed of an arc piece 15a extending along the circumferential direction of the inner surface of the round hole and a protrusion 15b protruding form the tip of the arc piece 15a toward the center of the round hole. The opposite end of each elastic member 15 to the tip is integrally fixed on the inner surface of the round hole. Because each elastic member 15 has the arc piece 15a, the elastic member 15 is likely to elastically deform in the thickness direction of the fixing plate 10, while still being reluctant to deform in the plane direction of the fixing plate 10. Each protrusion 15b has a tip 15c that faces the center of the round hole. The tip 15c is finished with a higher degree of dimensional accuracy to have a form that agrees with the outer surface of the cylindrical pillar 8a of the substrate 8.

On the other hand, to gain an easier deform in the thickness direction of the fixing plate 10, the arc piece 15a is made thinner than the thickness of the fixing plate 10 by for example etching the lower surface of the arch piece 15a. The protrusion 15b is formed to have the same thickness as that of the fixing plate 10, thereby being provided to possess a downward protruding portion 15d as shown in FIG. 11. The protrusions 15b, if measured at all the protruding portions 15d, are equal in thickness to the fixing plate 10.

Moreover, as illustrated in FIG. 9, at predetermined end-sided positions of the fixing plate 10, there are formed fitting holes 16 for fitting the fixing plate 10 on a later-described jig 11 and positioning markers 13 (which are holes) to be used during the process step for the strain gage portion 9. Those fitting holes 16 and positioning holes 13 are drilled during forming the through-holes 14.

The next step is illustrated by FIGS. 7 and 8, where the substrates 8 are fixedly mounted to the fixing plate 10. Practically, each substrate 8 is inserted into each through-hole 14 of the fixing plate from under the plate such that the diaphragm 8b is located above the fixing plate 10 and the annular protrusion 8c is brought into contact with the protruding portions 15d of the elastic members 15 for connection.

The mounting work for the substrates 8 can be performed using an image recognition system. With reference to such holes as the positioning markers 13 formed at given positions of the fixing plate 10 in advance, the substrates 8 are precisely positioned at given positions of the fixing plate 10. After this positioning process, a robot is used to resistance-weld the annular protrusion 8c with the elastic members 15 by the protruding portions 15d at each thorough-hole 14. Thus, each substrate 8 is connected to the fixing plate 10. As an alternative way, adhesives may be used to connect the substrates 8 to the fixing plate 10.

In this mounting step, it is enough that any portions of each substrate 8, other than the diaphragm 8b thereof, are fixed to the fixing plate 10. However, it is preferable that, as explained above, the annular protrusion 8c is connected to the elastic members 15 at each through-hole 14. Employing such a connection process allows the substrates 8 to be mounted to a later-described jig 11 without giving rise to damages on the inner surface of each substrate 8 including the diaphragm 8b. As a result, reliability will be raised when the strain-detecting device is applied to various apparatuses such as pressure vessels.

During the welding step, the protruding portion 15d formed at the tip of each elastic member 15 protrudes downward from the lower surface of the fixing plate 10, as the protruding portion 15d comes into contact with each metal-made substrate 8. This eliminates the necessity of using tools, which include a welding electrode whose tip is made thin and produced into a complicated shape. It is still possible for the protruding portion 15d to easily locate a spot to be welded for a steady welding operation, thus raising reliability in the welding.

Moreover, each substrate 8 is subjected to welding carried out at a plurality of spots (e.g., three spots) adapted to the elastic members 15, and sustained by the fixing plate 10. All the substrates 8 are therefore fixedly kept at predetermined positions of the fixing plate 10 so as not to shift in the plane direction of the plate 10. Accordingly, in the step of positioning the substrates 8, positioning accuracy in the plane direction of the plate 10 will be improved.

The fixing plate 10, with which a great number of substrates 8 are connected, is then mounted to a jig 11 dedicated to the process of the strain gage portion 9, as shown in FIGS. 13 and 14.

The jig 11 is provided with an upper plate 11a and a lower plate 11b. A large number of jig holes 17 are drilled at predetermined positions of the upper plate 11a which correspond to the positions of the through-holes 14 of the fixing plate 10. In addition, monitoring holes 18 are formed at given positions of the upper plate 11a in such a manner that the holes 18 positionally agrees with the positioning markers 13 of the fixing plate 10.

The upper surface of the upper plate 11a is finished to provide a high-precision smoothed surface that is able to function as a reference position 12 used when the strain gage portion 9 is processed. The lower surface of the upper plate 11a is also subject to finishing for a high-precision smoothed surface, because the lower surface 11b should serve as a surface contacting the annular protrusion 8c of each substrate 8.

To predetermined positions on both end sides of the upper plate 11a, connection screws 19 are applied for assembling the fixing plate 10 to the jig 11. In other words, the connection screws 19 penetrate through fitting holes 16 of the fixing plate 10 so as to engage with the lower plate 11b. This engagement enables the upper plate 11a to be fixedly linked with the lower plate 11b with the fixing plate 10 therebetween.

On the other hand, at predetermined positions of the lower plate 11b are formed a large number of through-holes 20 that faces, when linked with the fixing plate 10, the aperture of the cavity 8d of each substrate 8 held by the fixing plate 10. The upper surface of the lower plate 11b is finished into a smoothed surface, because it should come into contact with the lower ends of all the substrates 8 without gaps when being linked.

For assembling the fixing plate 10 to the jig 11, the fixing plate 10 is first placed on the lower plate 11b to make the lower ends of all the substrates 8 come into with the upper surface of the lower plate 11b. The upper plate 11a is then placed on the fixing plate 10 such that the lower surface of the upper plate 11a is laminated on the fixing plate 10 and concurrently the diaphragm 8b of each substrate 8 protrudes from each jig hole 17 of the upper plate 11a. The circumferential edge of each through-hole 14 of the fixing plate 10, including the elastic members 15, is thus pinched between the circumferential edge of each jig hole 17 of the upper plate 11a and each annular protrusion 8c of the substrate 8. During this pinching operation, the elastic members 15 can be deformed elastically in the thickness direction of the fixing plate 10, thus permitting the substrates 8 to contact the jig 11 elastically.

Hence all the diaphragms 8b are allowed to smoothly supported such that their upper surfaces are located at the same level, which is higher by a predetermined height than the reference position 12. Accordingly, those upper surfaces imaginably make up of the same plane.

Both the upper and lower plates 11a and 11b are then connected to each other by connection screws 19, thereby assembling (mounting) both the fixing plate 10 and the substrates 8 to the jig 11, thereby being integrated into one assembly, as shown in FIG. 14. All of the substrates 8 are thus supported by the jig 11 with the help of the fixing plate 10, where the upper surfaces of all the diaphragms 8b are accurately positioned at the same predetermined level higher than the reference position 12, with no looseness at all.

The strain gage portion 9 is then loaded on each of all the substrates 8 mounted to the jig 11. This process of the strain gage portion 9 is carried out according to the steps shown in FIG. 14.

Figure 15:
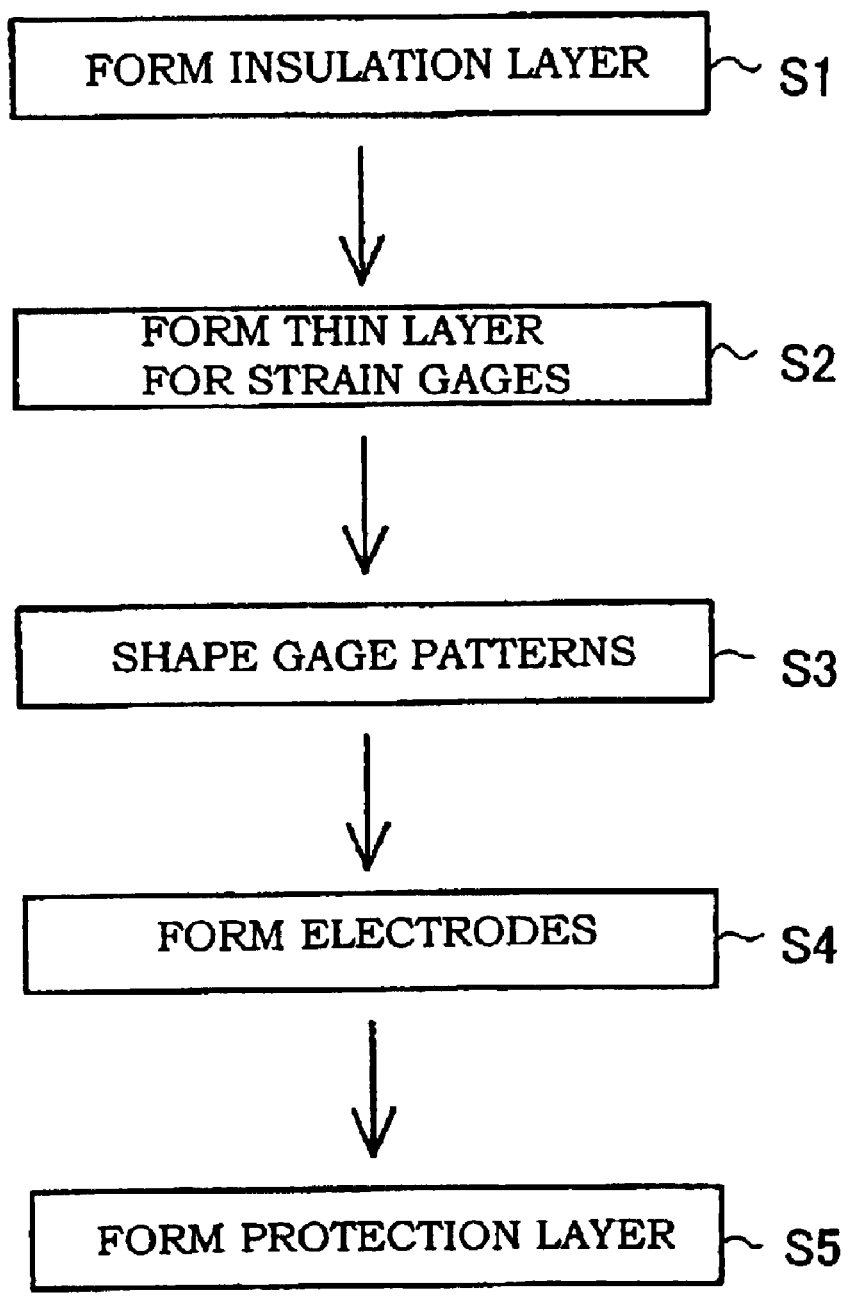
FIG. 15 outlines a flowchart showing various steps for forming a strain gage portion on each of the substrates.

Specifically, on the upper surfaces of the diaphragms 8b of the substrates 8, which are supported by the jig 11 with the aid of the fixing plate 10, an insulation layer 9a and a thin layer for strain gages are formed by turns (steps S1 and S2 in FIG. 15). Masks (not shown) are then positioned with higher precision by using as a reference the positioning markers 13 of the fixing plate 10, and the masks are used for pattering gages on a photolithography process, thus providing strain gages 9b (step S3 in FIG. 15). Electrodes 9c are then formed (step S4 in FIG. 15), before a surface protective layer 9d is layered thereon (step S5 in FIG. 15).

As stated above, the upper surfaces of all the diaphragms 8b are sustained, with higher positional precision, so as to form the same plane higher by a predetermined height than the reference position 12, with no looseness permitted. Hence using the same plane configuration makes it possible that each of the layers, such as the insulation layer 9a and strain gage 9b, is formed at a specified uniform thickness. In this configuration, it is preferred that the elastic members 15 of the fixing plate 10 are avoided from being positionally interfered with the lower edge of each jig hole 17 of the upper plate 11a. When such an configuration is adopted, the elastic members 15 are allowed to be displaceable in the thickness direction of the fixing plate 10, thus providing the strain gages 9b and other layers with higher degrees of precision.

Further, the upper surfaces of all the diaphragms 8b are located in the plane direction of the fixing plate 10 by using as a reference the positioning markers 13 formed at the fixing plate 10 beforehand. Accordingly, the layers, such as the insulation layer 9a and the strain gages 9b, are properly oriented and arranged on each of the diaphragms 8b. Namely, unlike the conventional reference placed at a given position on the jig, the positioning markers 13 of the fixing plate 10 can be used as positional references, under which the upper surfaces of all the diaphragms 8b are positioned in the plane direction of the fixing plate 10. This means that a higher precision is not necessarily required as to the positional relationship in the plane direction of the fixing plate 10 between the jig 11 and the substrates 8. As a result, the jig 11 can be produced with moderate positional precision in the plane direction of the fixing plate 10, thus making it possible to reduce a production cost thereof.

In manufacturing the strain-detecting devices, it is normal that a different jig is used every step or every several steps shown in FIG. 15. In the case that the conventional manufacturing methods are used, it is required that the substrates 8 be disassembled from the old jig and again assembled to a new jig, whatever such jigs are changed. However, in the case of the present embodiment, all of the substrates 8 are unified with the fixing plate 10, and always disassembled or assembled as one unit from or to a jig. Therefore, every time the old jig is replaced by a new one, no misalignment is generated between the substrates 8 and the masks. It is enough to arrange the masks with reference to the positioning markers 13 of the fixing plate 10, so that the masks can be located at higher precision. This highly accurate location eliminates the necessity of giving high-precision work to the jigs in their plane directions, thus enabling the strain-detecting devices to be manufactured at a lower cost.

Moreover, it has been stated that the through-holes 14 are formed at the predetermined positions of the fixing plate 10. The through-holes 14 provide a second function as follows. Though the process step of the strain gage portions 9 requires various chemical agents, such as cleaning fluid, developing fluid, rinsing fluid, and resist separating agent, the through-holes 14 help those agents outflow easily below the fixing plate 10 therethrough. Hence the residue of the chemical agents which is left on the substrates 8 after using the chemical agents can be largely lessened, thus providing that advantage that post steps can be made easier.

On completion of simultaneous process of the strain gage portions 9 on the diaphragms 8b of all the substrates 8, the connection screws 19 are loosened to disassemble the jig 11, before the fixing plate 10 is detached from the jig 11. The substrates 8, which have been completed as strain-detecting devices, are then removed from the fixing plate 10. It is preferable to use a punching press machine to cut the elastic members 15 placed at each substrate 8, so that the substrates 8 with the strain gage portions 9 (i.e., strain-detecting devices SG) are easily separated from the fixing plate 10. This separation can also be achieved by ungluing the welded portions.

The present invention may be embodied in other specific forms without departing from the spirit or essential characteristics thereof. The above embodiments and modifications are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2001-332863 filed on Oct. 30, 2001 including the specification, claims, drawings and summary is incorporated herein by reference in its entirety.

What is claimed is:

1. A method of manufacturing strain-detecting devices, comprising the steps of:

fixedly placing, in a plurality of through-holes formed at predetermined plural positions of a fixing plate, respectively, a plurality of cylindrical substrates each of which has one end closed by a diaphragm, an elastic member being formed to have a rod-shaped piece having two ends and being arranged in a circumferential direction along a round wall surface of each through-hole, one or both ends of the rod-shaped piece being integrally fixed on the wall surface, wherein a remaining one of both ends of the rod-shaped piece is elastically deformable in a thickness direction of the fixing plate, the remaining end of the rod-shaped piece having a protruding part integrally formed thereon to protrude in the thickness direction of the fixing plate, wherein the protruding part is connected to each substrate inserted through each through-hole, and a positioning marker being previously formed at a given position of the fixing plate;

mounting the fixing plate having the substrates to a jig so that the substrates are sustained by the jig to hold an outer surface of the diaphragm of each substrate at the same level higher by a predetermined height from a reference position of the jig;

positioning all the substrates so that all the diaphragms thereof are positioned in place in the plane direction of the fixing plate with reference to the positioning marker; and forming a strain gage portion on each of all the diaphragms at the same time.

2. The method according to claim 1, wherein each substrate has an annular protrusion integrally formed on an outer cylindrical surface thereof and the mounting step includes a step of fixedly connecting the annular protrusion of each substrate to the protruding part of each elastic member arranged in each through-hole.

3. The method according to claim 2, wherein the elastic member arranged in each through-hole consists of a plurality of elastic members.

4. The method according to claim 2, further comprising the step of separating each of the substrates from the fixing plate by cutting the elastic members after producing the strain gage portion on each diaphragm.

5. The method of according to claim 1, wherein the elastic member arranged in each through-hole consists of a plurality of elastic members.

6. The method according to claim 1, further comprising the step of separating each of the substrates from the fixing plate by cutting the elastic members after producing the strain gage portion on each diaphragm.

7. The method according to claim 1, wherein the rod-shaped piece is an arc-like rod-shaped piece having both ends located in a length direction of the piece, in which the arc-like rod-shaped piece is arranged in the circumferential direction along the round wall surface and the remaining one of both ends of the arc-like rod-shaped piece protrudes inward in a radial direction of each through-hole and is equal in thickness in the thickness direction to the fixing plate.

8. The method according to claim 3, wherein the plurality of elastic members are three in number.

* * * * *